No. 1,761. REISSUED SEPT. 13, 1864.
G. W. BILLINGS.
CLEANING AND SEPARATING THE FIBERS OF FLAX, HEMP, &c.
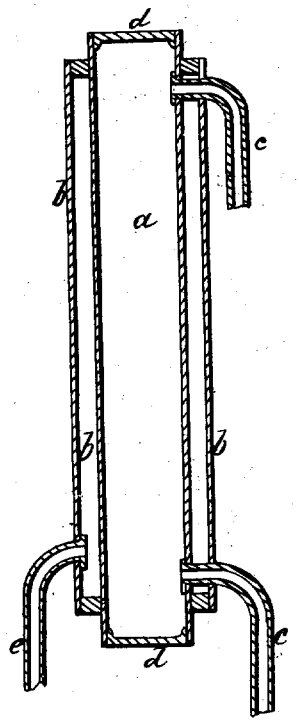
Witnesses;
Thos. Geo. Harold
William G. Mott
Inventor;
Geo W Billings
THE NORRIS PETERS CO., PHOTO-LITHO., WASHINGTON, D. C.

UNITED STATES PATENT OFFICE.

GEORGE W. BILLINGS, OF NEW YORK, N. Y.

IMPROVEMENT IN CLEANING AND SEPARATING THE FIBERS OF FLAX, HEMP, &C.

Specification forming part of Letters Patent No. 41,826, dated March 8, 1864; antedated February 21, 1864; Reissue No. 1,761, dated September 13, 1864.

*To all whom it may concern:*

Be it known that I, GEORGE W. BILLINGS, of the city and State of New York, have discovered and invented a new and useful method of cleaning and refining flax, hemp, and other vegetable fibers of a like or analogous nature, to be used in the preparation of such fibers for manufacturing, as a secondary process after the fiber is separated from the stalk, and in order to obtain the advantages hereinafter described.

Having discovered, by long conducted and repeated experiments, that the fiber of flax, hemp, and other vegetable substances of a like or analogous character, after having been subjected to any of the processes of retting or fermentation, by which the fiber is loosened from the stem preparatory to breaking and scutching, or otherwise removing the woody portions of the stalk, still retains a considerable amount of undissolved glutinous and silicious matter of a highly adhesive nature, which holds the ultimate or finer fibers closely together, and has heretofore required the application of mechanical means to open and separate the fibers, thereby more or less breaking, tearing, or otherwise injuring or wasting the same; and having also ascertained that by dissolving and removing such glutinous and silicious adhesive matter, such mechanical processes for opening and separating the fibers may be avoided, and the same may be rendered softer, more flexible, and silky, and be otherwise better adapted to the purposes of manufacture in spinning and weaving, and so as to reduce greatly the cost of manufacturing the same; and having also discovered that such glutinous and silicious adhesive matter so remaining in the fiber after the first retting or fermentation, is capable of being dissolved and removed without the use or application of any other chemical agent than such as already exists in and among the fiber itself, and in the method hereinafter described, all of which discoveries were fully made and tested before my application for the original Letters Patent, granted to me March 8, A. D. 1864, and now surrendered for reissue, and should have been described therein as fully as they are now stated, I do hereby declare that the following is a full and exact description of my newly invented process of subjecting such fiber to such process of fermentation, and preparing the same to be spun or otherwise manufactured, reference being had to the accompanying drawings, annexed to this and my former specification, according to the lettering of the same.

I take the fiber of flax, hemp, &c., which has been previously retted and dried, and broken and cleaned by any of the methods long practiced or recently invented, and whether the same is of greater or less lengths, or is known as bale flax, hemp, &c., or as tow or waste fiber; but I prefer for the production of the best effects, and the greater saving, to use fiber originally retted by the improved process patented to me in Letters Patent issued March 8, 1864, and numbered 41,825, but the woody portions may be removed or partially removed by any known method.

Having constructed a vat or tank of any suitable size or material—say twenty feet long, four feet wide, and three feet deep, of seasoned pine, or of any hard wood or other suitable material—I place in it a perforated platform raised two and a half inches from the bottom, for the purpose of forming a space between the bottom of the fiber and the bottom of the vat or tank to receive the deposits which may be loosened and deposited from the fiber. I then place in the vat or tank, upon the perforated platform, the flax, hemp, or other fiber, or in any way or form most convenient for handling, until the vat or tank is filled to within eight inches of the top, upon which I place a lattice covering of any suitable wood of sufficient strength and weight to prevent the fiber from rising to the top of the vat or tank. I then let into the vat or tank tepid water until it has covered the fiber to the depth of two or more inches, and keep it always covering the fiber and at a temperature of near 90° Fahrenheit by any of the known and usual artificial means of heating water by radiated heat. Steam may be used for this purpose in pipes so arranged as to keep the water in contact with their outer surfaces, but steam should not be injected into the water.

If the fiber has been water-retted, when placed in the vat or tank, in from ten to fifteen hours after the vat or tank is filled fermentation will begin and will continue from four to six days—that is, until acetous fermentation ceases—by which time the separation and loosening of the silex, resin, and other foreign deleterious matters is complete, and the liquid should be drawn off and the fiber removed from the vat or tank.

If the fiber has not been water-retted and has been worked dry, or has been dew-rotted or partially dew-rotted, the fermentation will not begin so soon, but after it has begun the fermentation of dew-rotted hemp will be completed in about forty-eight hours from the time of its beginning—that is, the acetous fermentation will terminate at about that time—after which putrid fermentation will set in unless the water is drawn off and the fiber removed, as above directed; hence, it will be understood that the fermentation on which I rely is the acetous fermentation, as distinguished from putrid fermentation, and care must be taken not to allow the latter to occur.

While the acetous fermentation is preparing to take place and is going on, the fiber should not be disturbed, but when the acetous fermentation has terminated I draw off the liquid from the vat or tank and rinse off the fiber before removing it by forcing through it clear tepid water. I then take the fiber from the vat or tank and thoroughly wash and dry it, which may be done by hand or by any suitable machinery. I prefer machinery, using steam in the following way and manner: I construct a pipe of from three (3) to six (6) inches in diameter and about three (3) feet long, which I surround with a steam jacket in such a way as will enable me to introduce into the jacket superheated steam, and thereby raise the temperature inside the pipes to about four hundred (400) degrees Fahrenheit. The ends of the pipes are so arranged that after being filled with the fiber they can be readily and tightly closed. The pipes being filled with the fiber, by means of connecting-pipes I inject warm water or steam under a pressure of about seventy (70) pounds to the square inch into them from each end alternately, which forces from and carries away from the fiber all the silex, resin, and other foreign and deleterious matters which may still have remained with it when put into the pipes, the water or steam being ejected through the pipes until the fiber has been thoroughly cleansed. After the fiber is thus washed I introduce superheated steam into the steam-jacket, by which the fiber is thoroughly dried, after which it is taken from the pipes.

The pipes for washing may be made in nests of two or more and be operated by mechanical means and the steam and hot water fed to them in the same way and manner or any similar way and manner that steam is applied to an engine.

To accelerate the washing, alkali or soap may be added to the water.

I do not confine myself to the method above described of leaving the fiber in the vat or tank immersed in the same tepid water with which the vat is first filled until it is removed to be washed and cleansed, but the tepid water may be changed as often as desired, the fiber continued to be immersed so long as fermentation continues, and to be removed for washing only and so soon as the fermentation ceases.

The figure represents a cross-section of the wash and dry pipe and the steam-jacket.

*a* is the pipe to contain the fiber or material to be washed and dried; *b b b*, the steam-jacket; *c c*, the pipes to supply the steam and water; *d d*, the ends of the pipes, which are movable; *e*, the pipe through which the superheated steam is conveyed into the steam-jacket.

What I claim, and desire to secure by Letters Patent, is—

1. The process herein specified of subjecting vegetable fiber to a retting or fermenting operation after the stalk or other woody portions have been removed or partially removed, for the purposes and substantially as specified.

2. The process of washing the vegetable fiber in alternate directions for its cleansing while contained in a closed vessel, for the purposes and in the mode substantially as specified.

In witness whereof I have hereunto set my signature this 14th day of August, 1864.

GEO. W. BILLINGS.

Witnesses:

LEMUEL W. SERRELL,
THOS. GEO. HAROLD.